Nov. 20, 1928.
L. V. STOELTZLEN
DIESTOCK
Filed Jan. 6, 1927
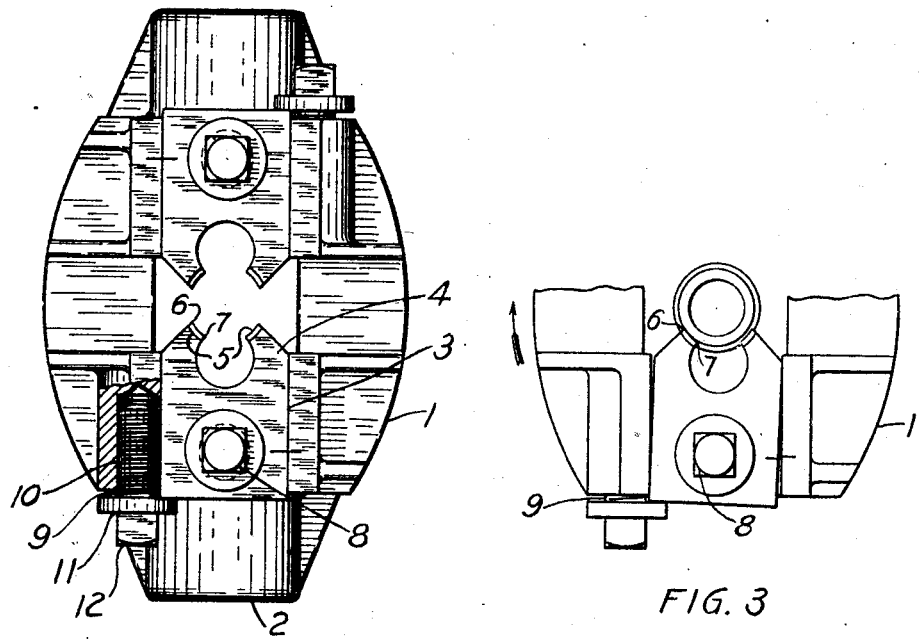
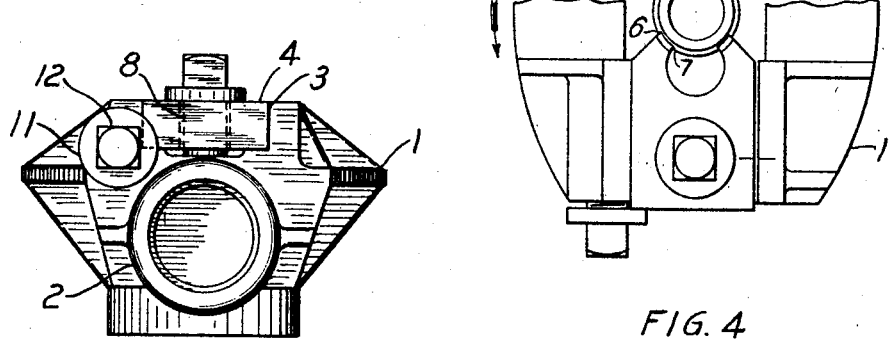

Patented Nov. 20, 1928.

1,692,353

UNITED STATES PATENT OFFICE.

LEO V. STOELTZLEN, OF ERIE, PENNSYLVANIA, ASSIGNOR TO REED MANUFACTURING COMPANY, OF ERIE, PENNSYLVANIA.

DIESTOCK.

Application filed January 6, 1927. Serial No. 159,304.

This invention is particularly directed to adjustable die stocks in which the chasers are slidingly mounted and movable toward and from each other to vary the depth of the thread cut. With such devices it is desirable to have means for definitely adjusting and holding the chasers as against the thrust of the cut. With the present invention this is accomplished by a screw extending along the chaser guide and having its head overlapping the end of the chaser so as to form a backing for the chaser holding the chaser against the thrust of the cut. Preferably the screw is arranged at the side adjacent to the cutting edge of the chaser so that whatever slack there may be in the guide tends to relieve the chaser as it is turned backward to run off the thread. Features and details of the invention will appear from the specification and claim.

The invention is illustrated in the accompanying drawings as follows:—

Fig. 1 shows a plan view of the stock.

Fig. 2 an end elevation.

Fig. 3 an alternative view showing the chaser under the thrust and strains as it is in cutting.

Fig. 4 an illustrative drawing showing the position of the chaser as the stock is backed off the thread.

1 marks the body of the stock. This is provided with handle sockets 2, the chaser guide groove 3, and chasers 4 slidingly mounted in the groove, the chasers having the double cutting faces 5 having the cutting edges 6 and backing away edges 7. The chasers are provided with the usual slots through which clamping screws 8 extend into the head, these screws holding the chasers in the groove and also clamping them in place.

A screw 9 extends into a screw-threaded opening 10 extending along one wall of the guide groove 3. The screw has a head 11 extending laterally sufficiently to overlap the end of the chaser and is provided with a squared end 12 forming a wrench-hold for operating the screw.

The screw forms a backing receiving the thrust of the chaser as it is cutting a thread and also serves in adjusting the same. It will be noted that the screw extends in line with the guide and with the handle socket and the wall of the groove itself forms a convenient body for the opening 10, the whole making a very compact device for accomplishing this purpose.

I prefer to arrange the screw at the forward side of the groove, that is to say, so that the cutting edge 6 will be toward the wall of the groove having the screw 9. Where this is done whatever slack there may be between the chaser and the walls of the groove tends to tilt the chaser to the position shown in Fig. 3, the screw retaining the front edge of the chaser and there being a slight retraction of the opposite edge of the chaser. When the stock is reversed to back off the thread the chaser returns to its normal position and thus relieves the teeth of the chaser from the threads cut so that the backing off may be very much more readily accomplished.

What I claim as new is:—

In a die stock, the combination of a body having a two-sided chaser guide groove and a screw-threaded opening along one wall of the groove; a chaser slidingly mounted and freely movable in the groove and supported at its side edges directly and only by the walls of the guide groove; and a screw in the screw opening having a head overlapping the end of the chaser, said screw forming the only backing support of the chaser and supporting said chaser only at one edge whereby the lateral yielding of the chaser in the groove under the torque of cutting pressure tends to close the die and the backing off movement tends to open the die.

In testimony whereof I have hereunto set my hand.

LEO V. STOELTZLEN.